United States Patent
Hodrinsky et al.

(10) Patent No.: US 8,890,427 B2
(45) Date of Patent: Nov. 18, 2014

(54) APPARATUS AND METHOD OF OPERATION OF A LOW-CURRENT LED LIGHTING CIRCUIT

(71) Applicant: Liteideas, LLC, Mansfield Center, CT (US)

(72) Inventors: Todd W Hodrinsky, Mansfield Center, CT (US); Donald T Wesson, Jr., Ashford, CT (US)

(*) Notice: Subject to any disclaimer, the term of this patent is extended or adjusted under 35 U.S.C. 154(b) by 92 days.

(21) Appl. No.: 13/736,157

(22) Filed: Jan. 8, 2013

(65) Prior Publication Data
US 2014/0117866 A1    May 1, 2014

Related U.S. Application Data

(60) Provisional application No. 61/718,749, filed on Oct. 26, 2012.

(51) Int. Cl.
| | |
|---|---|
| H05B 37/00 | (2006.01) |
| H05B 39/00 | (2006.01) |
| H05B 41/14 | (2006.01) |
| G05F 1/607 | (2006.01) |
| H02M 1/14 | (2006.01) |
| H05B 37/02 | (2006.01) |

(52) U.S. Cl.
CPC *H02M 1/14* (2013.01); *H05B 37/02* (2013.01)
USPC .............................. 315/201; 315/36; 323/227

(58) Field of Classification Search
CPC ...... H05B 37/029; B23K 11/248; H02M 1/02
USPC ..................................... 315/201, 192, 200, 36
See application file for complete search history.

(56) References Cited

U.S. PATENT DOCUMENTS

| | | | |
|---|---|---|---|
| 6,700,333 B1 * | 3/2004 | Hirshi et al. ................... | 315/291 |
| 7,221,044 B2 | 5/2007 | Fan et al. | |
| 7,276,861 B1 | 10/2007 | Shteynberg et al. | |
| 7,583,035 B2 | 9/2009 | Shteynberg et al. | |
| 7,598,685 B1 | 10/2009 | Shteynberg et al. | |
| 7,658,510 B2 | 2/2010 | Russell | |
| 7,710,047 B2 | 5/2010 | Shteynberg et al. | |
| 7,715,216 B2 * | 5/2010 | Liu et al. .......................... | 363/89 |
| 7,880,400 B2 | 2/2011 | Zhou et al. | |
| 7,888,881 B2 | 2/2011 | Shteynberg et al. | |
| 7,902,769 B2 * | 3/2011 | Shteynberg et al. .......... | 315/291 |
| 8,067,896 B2 | 11/2011 | Shteynberg et al. | |
| 8,222,825 B2 | 7/2012 | Kang et al. | |
| 8,299,724 B2 | 10/2012 | Huynh | |
| 2009/0167202 A1 | 7/2009 | Miskin et al. | |
| 2009/0289267 A1 | 11/2009 | Burdalski et al. | |
| 2010/0045187 A1 | 2/2010 | Shteynberg et al. | |
| 2010/0060181 A1 | 3/2010 | Choi et al. | |
| 2010/0109558 A1 | 5/2010 | Chew | |

(Continued)

*Primary Examiner* — Dylan White
(74) *Attorney, Agent, or Firm* — Law Office of Ilya Libenzon (57) ABSTRACT

An apparatus and method of operation of a low-current LED lighting circuit are disclosed. The invention utilizes high AC voltage input and unreduced voltage ripple component of the rectified DC power signal, which provides the ability to drive an LED load at high power factor at low current. The invention discloses both active and passive circuits to limit the peak current flowing to the LED and create a current source for the LED load. The proposed circuit increases reliability by optionally eliminating capacitor, inductor, and heatsink components while minimizing luminous flux fluctuations.

18 Claims, 8 Drawing Sheets

(56) References Cited

U.S. PATENT DOCUMENTS

| | | |
|---|---|---|
| 2010/0213859 A1 | 8/2010 | Shteynberg et al. |
| 2010/0237800 A1* | 9/2010 | Kang et al. .................. 315/294 |
| 2010/0270931 A1 | 10/2010 | Hui |
| 2011/0084619 A1* | 4/2011 | Gray et al. ................ 315/185 R |
| 2011/0115411 A1 | 5/2011 | Shteynberg et al. |
| 2011/0121740 A1 | 5/2011 | Shih |
| 2011/0121754 A1 | 5/2011 | Shteynberg et al. |
| 2011/0127920 A1* | 6/2011 | Huang et al. ................. 315/192 |
| 2011/0234114 A1 | 9/2011 | Miskin et al. |
| 2011/0309759 A1 | 12/2011 | Shteynberg et al. |
| 2012/0043884 A1* | 2/2012 | Lee et al. ........................ 315/32 |
| 2012/0081018 A1 | 4/2012 | Shteynberg et al. |
| 2012/0153833 A1* | 6/2012 | Mikani et al. ................. 315/122 |
| 2012/0242239 A1 | 9/2012 | Miskin et al. |
| 2012/0293083 A1 | 11/2012 | Miskin et al. |
| 2012/0320595 A1* | 12/2012 | Enke ........................ 362/249.06 |
| 2013/0293122 A1* | 11/2013 | Huynh ....................... 315/185 R |
| 2014/0042918 A1* | 2/2014 | Lee ........................... 315/185 R |
| 2014/0062317 A1* | 3/2014 | Lee ........................... 315/185 R |
| 2014/0084801 A1* | 3/2014 | Lys .............................. 315/201 |

* cited by examiner

APPARATUS AND METHOD OF OPERATION OF A LOW-CURRENT LED LIGHTING CIRCUIT

RELATED APPLICATION DATA

This application claims the priority of prior U.S. provisional application Ser. No. 61/718,749 filed on Oct. 26, 2012, which is hereby incorporated by reference herein in its entirety.

TECHNICAL FIELD

Embodiments of the present invention relates generally to LED lighting circuits, and more particularly to an apparatus and method of operation of a low-current LED lighting circuit.

BACKGROUND ART

A light emitting diode ("LED") can provide light in a more efficient manner than an incandescent light source and/or a fluorescent light source. The relatively high efficiency associated with LEDs has created an interest in using LEDs to displace conventional light sources in a variety of lighting applications. For example, LEDs are being used in traffic lighting, residential lighting, automobile lighting systems, flashlights, and to illuminate cell phone keypads and displays.

LED lighting circuits that use standard AC input power ("AC mains") generally include an input power circuit that converts AC input power to a rectified DC power signal, circuitry or components to filter or reduce the voltage ripple component of the DC power signal, and circuitry to create a current from the DC power signal and control its peak current flow to the LED load. Some circuits also include capacitors to act as an energy storage buffer, providing the difference between the varying input voltage of the AC mains and the relatively constant power consumed by the LED load. A typical LED load is an LED mesh circuit, well known in the prior art, which can include a number of LEDs in series, parallel branches of LEDs in series, or combinations thereof.

The reliability of an LED lighting circuit can be improved by eliminating the components with the lowest Mean Time Between Failures ("MTBF") of the individual components that make up the circuit. LEDs are very high-reliability components, which have a typical Mean Time Between Failures ("MTBF") in the range of 100,000 to 1,000,000 hours, whereas devices that store energy, such as capacitors, are the lowest-reliability components. Electrolytic capacitors, which are heavily used in industry, have a typical MTBF in the range of 15,000 to 50,000 hours.

Prior art devices consume a significant amount of power to operate their ripple voltage reducing circuitry and capacitive coupling circuitry, which subtracts from the power that can be delivered to the LED load. The addition of capacitor, inductor, and heatsink components also adds to complexity and cost. Because prior art LED lighting circuits typically utilize combinations of capacitor, inductor, and heatsink components to reduce the ripple voltage of the rectified DC signal, and capacitors to provide an energy buffer between the varying input voltage of the AC mains and the near constant power consumed by the LED load, such circuits have their reliability limited by the MTBF of their capacitors, do not drive an increasing number of LEDs with increasing AC mains voltage while also maintaining low current to the LED load, are expensive, and can be complicated to build and package. The present invention addresses the above-noted shortcomings of the prior art while providing additional benefits and advantages.

SUMMARY OF THE EMBODIMENTS

It is therefore an object of the present invention to provide an LED lighting circuit and related method that result in a high MTBF. It is a further object of the present invention to provide an LED lighting circuit and related method that results in a circuit that provides higher AC input voltage and more power to the LED load than in prior art devices, while also maintaining low current to the LED load. It is yet a further object of the present invention to provide an LED lighting circuit and related method that is less expensive than prior art devices. It is yet a further object of the present invention to provide an LED lighting circuit and related method that is less complicated and easier to package than prior art devices.

According to the present invention, there is provided an LED lighting circuit comprising: (a) a rectification circuit for converting an AC input power signal to a rectified DC power signal; (b) a peak current limiting circuit electrically coupled to the rectification circuit for providing a peak current limiting means from the voltage ripple of said rectified DC power signal, wherein said voltage ripple is intentionally unreduced, whose output creates a current source; and (d) an LED mesh circuit electrically coupled to the output of the peak current limiting circuit and receives said current source as an input.

In another example of the present invention, one or more resistors provide the peak current limiting means. This limits the peak current flowing to the LED load.

In another example of the present invention, an active circuit provides the peak current limiting means. This limits the peak current flowing to the LED load, and can also regulate the voltage across the peak current limiting circuit.

In another example of the invention, capacitor, inductor, and heatsink components are omitted. This allows for maximum voltage input to the peak current limiting circuit, increases the MTBF of the entire LED lighting circuit, lowers cost, and simplifies design and packaging.

In another example of the present invention, the LED mesh circuit comprises at least one LED.

In another example of the present invention, the LED lighting circuit is encapsulated by an electrically insulating material. Use of electrically insulating materials include but are not limited to protecting circuits from such matters as mechanical and humidity, and may be used to perform other functions, such as light emission.

In another example of the present invention, the AC input power range is between 50 VRMS, inclusive, and 350 VRMS, inclusive, with a maximum of 20% of the AC input power allocated to the peak current limiting circuit, with the current source equal to or less than 20 mA per LED.

In yet another example of the present invention, the unreduced voltage ripple input to the peak current limiting circuit is allowed to vary, and at least one electrical characteristic of at least one of the LEDs in the LED mesh circuit is chosen such that variations in the luminous flux intensity are rendered unobservable to the human eye. To ensure that the variations in luminous flux intensity are rendered unobservable to the human eye, the frequency of the voltage ripple input should be in the range of 60 Hz, inclusive, and 1 KHz, inclusive.

In another embodiment of the present invention, the LED lighting circuit further comprises a potentiometer AC dimmer circuit connected to the AC input power signal that limits the voltage across the peak current limiting circuit, thereby making the LED mesh circuit dimmable.

In another embodiment of the present invention, the LED lighting circuit further comprises a triac AC dimmer circuit connected to the AC input power signal that lowers the duty cycle of the peak current limiting circuit, thereby making the LED mesh circuit dimmable.

Viewed from another broad aspect, the present invention provides a method of operating an LED lighting circuit, comprising the steps of: (a) rectifying an AC power input signal to a rectified DC power signal; (b) producing an intentionally unreduced voltage ripple from said rectified DC power input signal; (c) electrically coupling a peak current limiting circuit to the rectification circuit for providing a peak current limiting means from the voltage ripple of said rectified DC power signal, wherein said voltage ripple is intentionally unreduced, whose output creates a current source; and (d) electrically coupling an LED mesh circuit to the output of the peak current limiting circuit and receiving said current source as an input.

Another form of the present invention provides a method wherein one or more resistors provide the peak current limiting means. This limits the peak current flowing to the LED load, and regulates the voltage across the peak current limiting circuit.

Another form of the present invention provides a method wherein an active circuit provides the peak current limiting means. This limits the peak current flowing to the LED load, and can also regulate the voltage across the peak current limiting circuit.

Another form of the present invention provides a method wherein capacitor, inductor, and heatsink components are omitted. This allows for maximum voltage input to the peak current limiting circuit, increases the MTBF of the entire LED lighting circuit, lowers cost, and simplifies design and packaging.

Another form of the present invention provides a method wherein the LED mesh circuit comprises at least one LED.

Another form of the present invention provides a method wherein the LED lighting circuit is encapsulated by an electrically insulating material. Use of electrically insulating materials include but are not limited to protecting circuits from such matters as mechanical and humidity, and may be used to perform other functions, such as light emission.

Another example of the present invention preferably provides a method wherein the AC input power range is between 50 VRMS, inclusive, and 350 VRMS, inclusive, with a maximum of 20% of the AC input power allocated to the peak current limiting circuit, with the current source equal to or less than 20 mA per LED.

Another example of the present invention provides a method wherein the unreduced voltage ripple input to the peak current limiting circuit is allowed to vary, and at least one electrical characteristic of at least one of the LEDs in the LED mesh circuit is chosen such that variations in the luminous flux intensity are rendered unobservable to the human eye.

Another embodiment of the present invention provides a method wherein the LED lighting circuit further comprises a potentiometer AC dimmer circuit connected to the AC input power signal that limits the voltage across the peak current limiting circuit, thereby making the LED mesh circuit dimmable.

Another embodiment of the present invention provides a method wherein the LED lighting circuit further comprises a triac AC dimmer circuit connected to the AC input power signal that lowers the duty cycle of the peak current limiting circuit, thereby making the LED mesh circuit dimmable.

Other aspects, embodiments and features of the invention will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The preceding summary, as well as the following detailed description of the invention, will be better understood when read in conjunction with the attached drawings. For the purpose of illustrating the invention, presently preferred embodiments are shown in the drawings. It should be understood, however, that the invention is not limited to the precise arrangements and instrumentalities shown.

DETAILED DESCRIPTION OF SPECIFIC EMBODIMENTS

Figure 1:
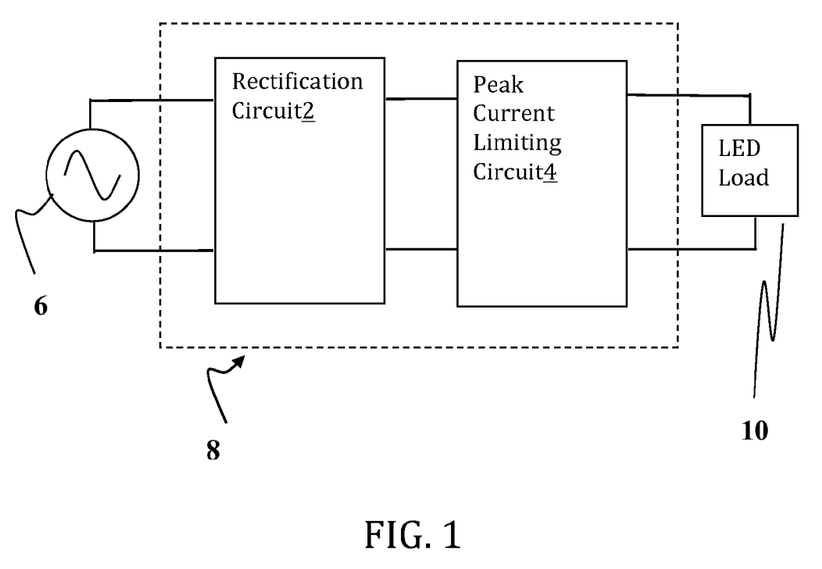
FIG. 1 shows a block diagram of an LED lighting system that eliminates traditional capacitive coupling after rectification, which provides unreduced voltage ripple of rectified DC power as input to a peak current limiting circuit, that in turn, drives an LED load.
Figure 2:
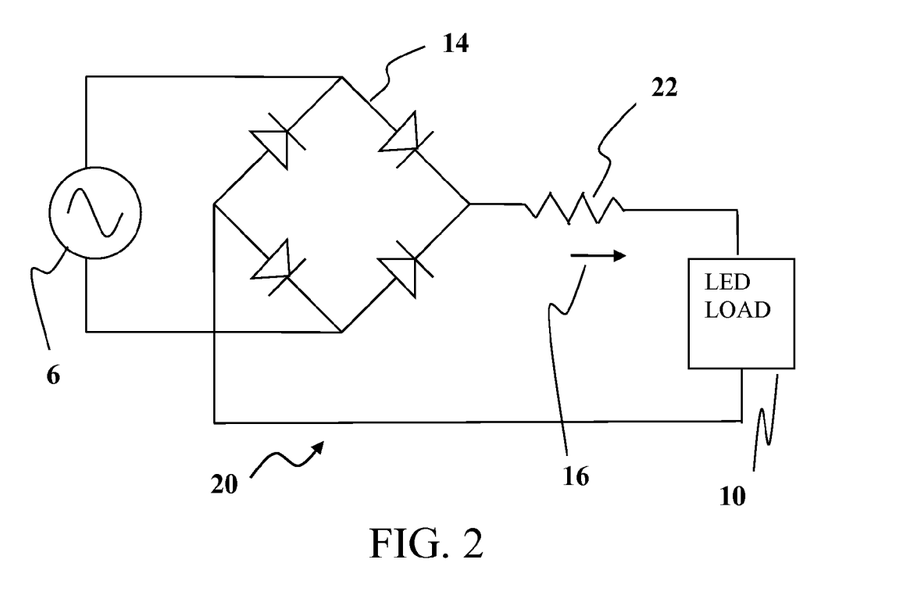
FIG. 2 shows a schematic view of a preferred embodiment of the invention, wherein the rectification circuit includes a full-wave rectifier, and the peak current limiting circuit includes a resistor.

One important aspect of this invention is to provide an LED lighting circuit and related method that results in a high MTBF, where the entire LED lighting circuit can be more reliable, last longer, and be less expensive to build. FIG. 1 discloses a block diagram of an LED lighting circuit 8, which includes AC mains 6, Rectification Circuit 2, Peak Current Limiting Circuit 4, and LED load 10. FIG. 2 illustrates this aspect of the invention by intentionally omitting the lower MTBF components, such as capacitors, inductors, and heatsinks.

FIG. 2, in accordance with a preferred embodiment of the present invention, discloses a schematic diagram of an LED lighting circuit 20, with AC mains 6, LED LOAD 10, with full-wave rectifier 14 as an example of the FIG. 1 Rectification Circuit 2, and peak current limiting means 22 (a resistor) as an example of the FIG. 1 Peak Current Limiting Circuit 4.

In contrast to prior art lighting circuits, FIG. 2 contains no capacitive coupling after full-wave rectifier 14, which intentionally leaves the voltage ripple of the rectified DC power signal unreduced and at a maximum possible value. This allows for more power to be allocated to the peak current limiting means 22 (a resistor), which creates current source 16, which supplies current to the LED LOAD 18.

Figure 3:
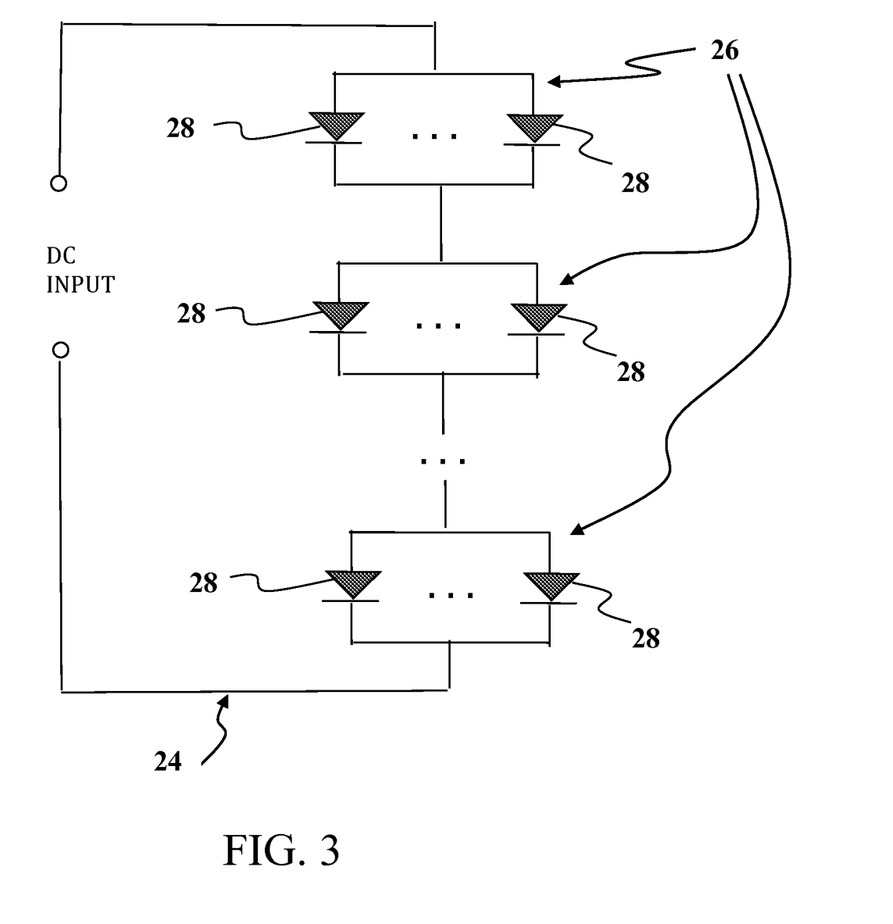
FIG. 3 shows a schematic view of a typical LED load, configured in an LED mesh circuit.

FIG. 3 discloses a schematic diagram of a typical LED mesh circuit 24, well-known in the prior art, as an implementation of LED load 10 disclosed in FIG. 1 and in FIG. 2, to illustrate that in accordance with a preferred embodiment of the present invention, no capacitive, inductive, or heatsink components are included in the LED mesh circuit 24. FIG. 3 includes one or more LEDs 28, wired in parallel to form branch circuits 26. When more than one branch circuits 26 are connected in series, they form a typical LED mesh circuit 24. A preferred embodiment of the invention includes a count of eighty LEDs 28 in the LED mesh circuit 24.

Figure 4:
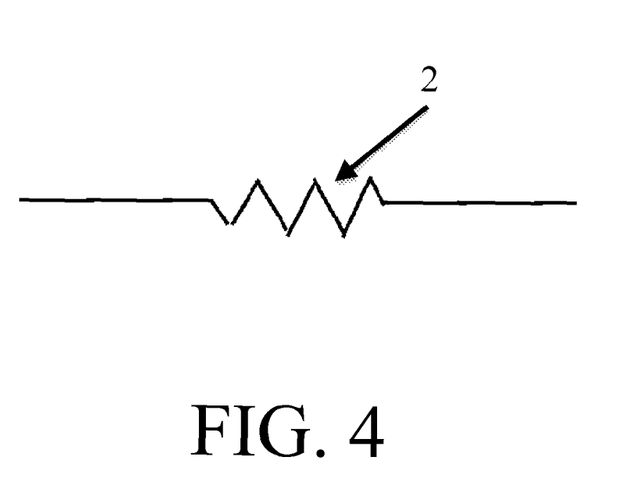
FIG. 4 shows a schematic diagram of implementations of the peak current limiting circuit.

FIG. 4 shows a schematic diagram of a circuit to implement FIG.1 Peak Current Limiting Circuit 2 and create FIG.2 current source 16, according to embodiments of the invention, that can provide high-reliability and low cost. FIG. 4 shows a passive circuit.

Additionally important aspects of the present invention provide an LED mesh circuit and related method that are less expensive than prior art devices, and less complicated and easier to package than prior art devices. When the LED mesh circuit 24 disclosed in FIG. 3 is used as the LED load 10 disclosed in FIG. 2, this significantly simplifies LED mesh circuit(s) 24 as compared to prior art devices, and the fewer number of components makes the LED mesh circuit 24 less expensive to produce and package as compared to prior art devices.

It is a further object of the present invention to provide an LED lighting circuit and related method that operates at a higher AC input power range and at lower current than prior art devices. An example illustrating the present invention includes a FIG. 1 AC mains 6 power range between 50 VRMS, inclusive, and 350 VRMS, inclusive, with a maximum of 20% of the FIG. 1 AC mains 6 power allocated to the FIG. 1 Peak Current Limiting Circuit 2, which creates FIG. 2 current source 16 value equal to or less than 20 mA per FIG. 3 LED 28.

Figure 5:
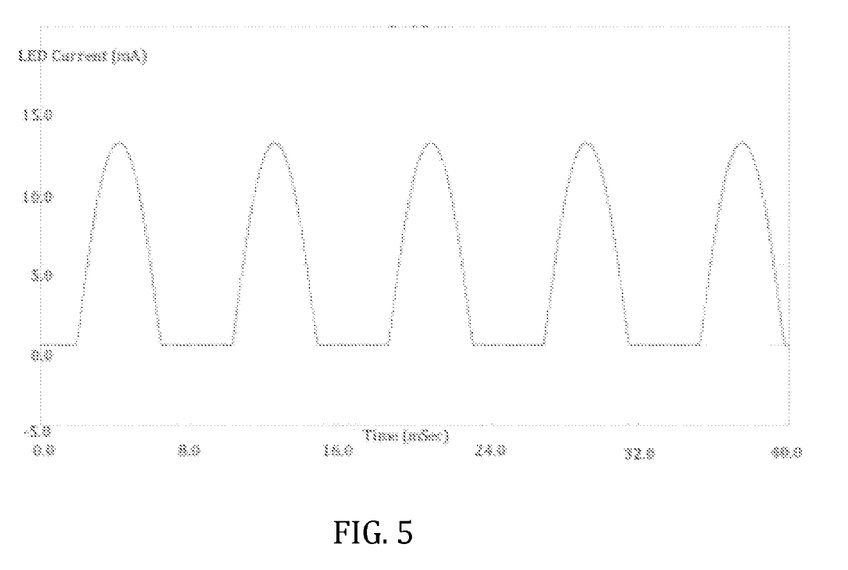
FIG. 5 shows simulated current per LED for the circuit in FIG. 3.
Figure 6:
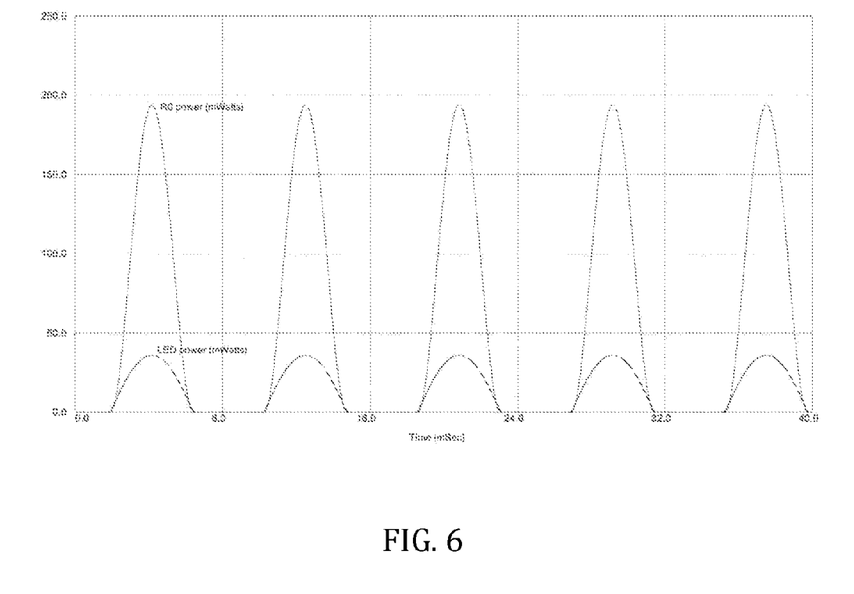
FIG. 6 shows simulated power curves for the LED and resistor for the circuit in FIG. 3.

FIG. 5 shows simulated current for the FIG. 2 LED LOAD 10, and FIG. 6 shows simulated power for the FIG. 2 peak current limiting means 22 (a resistor) and for each FIG. 3 LED 28 in FIG. 2 LED LOAD 10. For the simulation, the FIG. 2 AC mains value is set to 120 VRMS, the value of FIG. 2 peak current limiting means 22 (a resistor) is set to 2000 ohms, and the voltage drop across FIG. 2 peak current limiting means 22 (a resistor) is set to 3.5 VDC. Note that the FIG. 5 simulated current waveform is also an embodiment of the FIG. 2 current source 16 that flows through each FIG. 3 LED 28 in FIG. 3 LED mesh circuit 24. The larger curve in FIG. 6 shows the power dissipation for peak current limiting means 22 (a resistor), and the smaller curve in FIG. 6 shows the power dissipation for each FIG. 3 LED 28 in FIG. 2 LED LOAD 10.

An example of the invention discloses a typical FIG. 3 LED mesh circuit 24 comprised of two (2) FIG. 3 branch circuits 26 containing forty (40) FIG. 3 LEDs 28 each in series, a proverbial "2×40" FIG. 3 LED mesh circuit 24. Using the same values for the simulations in FIG. 5 and FIG. 6, based on the FIG. 2 LED lighting circuit 20, the amount of voltage required to turn on one of the FIG. 3 LED mesh circuits 24 would be the voltage drop of 3.5 VDC across each FIG. 3 LED 28 multiplied by forty (40) FIG. 3 LEDs 28 for a total of 140 VDC. With approximately 20V across the FIG. 2 peak current limiting means 22 (a resistor), this creates a FIG. 2 current source 16 limited to a value of 10 mA, 5 ma in each FIG. 3 branch circuit 26 of FIG. 3 LED mesh circuit 24.

The total power dissipated at each FIG. 3 branch circuit 26 of forty (40) FIG. 3 LEDs 28 is 3.5 VDC*5 mA*40=0.7 watts, and the total power for eighty (80) FIG. 3 LEDs 28 is 1.4 Watts. A typical 350 mW white LED can produce 2.5 to 5 lumens (lm) when driven at 5 ma. Therefore, eighty (80) FIG. 3 LEDs 28 at 5 lm yields a total of 400 lm.

In yet further examples of the present invention there will be fluctuations of the power at FIG. 1 LED LOAD 10, but it is possible to obtain luminous output from the FIG. 1 LED lighting system 8 with minimum luminous flux that will be unobservable by the human eye.

Figure 7A:
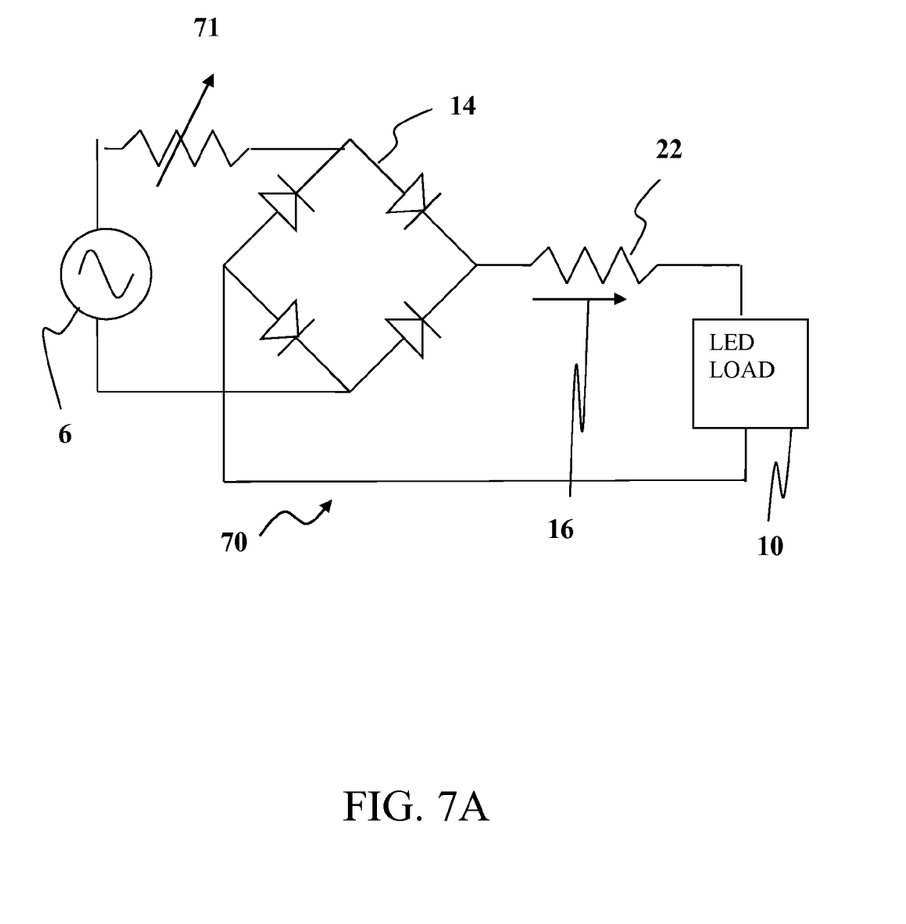
FIG. 7A shows a schematic of another embodiment of the present invention, which includes a potentiometer AC dimmer circuit.

FIG. 7A discloses a schematic diagram of another embodiment of the present invention, LED lighting circuit 70, where the average current encountered by the LED mesh circuit is controllable, either remotely or locally, by controlling the impedance of the peak current limiting circuit. Like the FIG. 2 LED lighting circuit 20, LED lighting circuit 70 comprises an AC mains 6, LED LOAD 10, full-wave rectifier 14 as an example of the FIG. 1 Rectification Circuit 2, and peak current limiting means 22 (a resistor) as an example of the FIG. 1 Peak Current Limiting Circuit 4. However, LED lighting circuit 70 additionally connects a potentiometer AC dimmer circuit 71 to the AC mains 6. The potentiometer AC dimmer circuit 71 varies the impedance between the AC mains 6 and the peak current limiting means 22, which limits the peak current seen by the LED LOAD 10, thereby making the light-emitting devices in the LED LOAD 10 dimmable. For example, if 20V is allocated to the peak current limiting means 22, then changing the impedance from 2k Ohms to 1K Ohms doubles the peak current and increases the Luminous flux. The increase in Luminous flux is dependent on the LED selected, typically a 2:1 increase in current produces a 2:1 increase in flux. Note that the peak current limiting can be controllable (adjustable) either remotely or locally to LED lighting circuit 70.

Figure 7B:
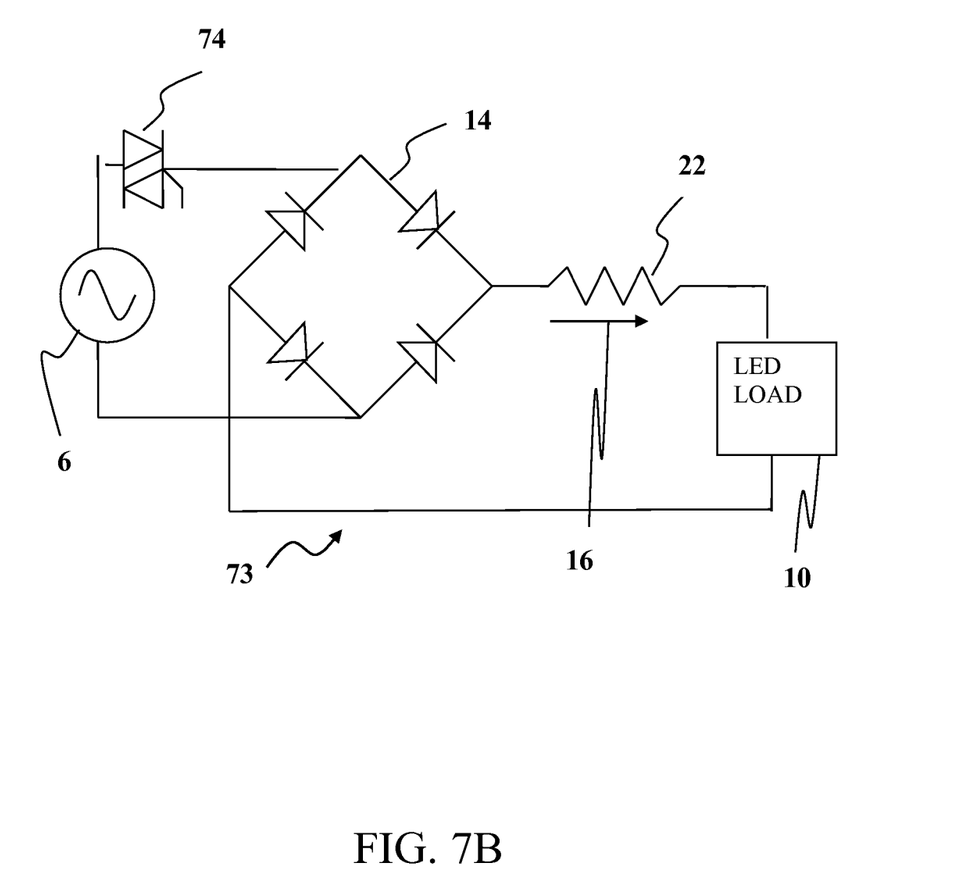
FIG. 7B shows a schematic of yet another embodiment of the present invention, which includes a triac AC dimmer circuit.

FIG. 7B discloses a schematic diagram of yet another embodiment of the present invention, LED lighting circuit 73, where the average luminous flux output of the LED mesh circuit is controllable, either remotely or locally, by controlling the duty cycle of the peak current limiting circuit. Like the FIG. 2 LED lighting circuit 20, LED lighting circuit 73 comprises an AC mains 6, LED LOAD 10, full-wave rectifier 14 as an example of the FIG. 1 Rectification Circuit 2, and peak current limiting means 22 (a resistor) as an example of the FIG. 1 Peak Current Limiting Circuit 4. However, LED lighting circuit 73 additionally connects a triac AC dimmer circuit 74 to the AC mains 6. A triac is a solid-state switch that can be used to vary the duty cycle of a circuit, which is the time that the AC voltage is applied to the circuit.

For example, a circuit having a 60% duty cycle has AC power applied to the circuit 60% of the time (e.g. turned on) and AC power removed from the circuit 40% of the time (e.g. turned off). Connecting the triac AC dimmer circuit 74 to the AC mains 6 controls the duty cycle of the peak current limiting circuit, which limits the peak current seen by the LED LOAD 10, thereby making the light-emitting devices in the LED LOAD 10 dimmable. For example, by adjusting the triac AC dimmer circuit 74 to half of the current duty cycle of LED lighting circuit 73, the average current applied to the LED LOAD 10 will be reduced by half, therefore reducing the luminous flux produced by the LED LOAD 10.

It will be understood that the invention may be embodied in other specific forms without departing from the spirit or central characteristics thereof The present examples and embodiments, therefore, are to be considered in all respects as illustrative and not restrictive, and the invention is not to be limited to the details given herein.

What is claimed is:

1. An LED lighting circuit comprising:
   a rectification circuit for converting an AC input power signal to a rectified DC power signal;
   a peak current limiting circuit electrically coupled to the rectification circuit for providing a peak current limiting means from the voltage ripple of said rectified DC power signal, wherein said voltage ripple is intentionally unreduced, whose output creates a current source; and
   an LED mesh circuit electrically coupled to the output of the peak current limiting circuit and receives said current source as an input;
   wherein the AC input power range is between 50 VRMS, inclusive, and 350 VRMS, inclusive, with a maximum of 20% of the AC input power allocated to the peak current limiting circuit, with said current source equal to or less than 20 mA per LED.

2. The LED lighting circuit of claim 1, wherein one or more resistors provide said peak current limiting means.

3. The LED lighting circuit of claim 1, wherein an active circuit provides said peak current limiting means.

4. The LED lighting circuit of claim 1, wherein capacitor, inductor, and heatsink components are omitted.

5. The LED lighting circuit of claim 1, wherein said LED mesh circuit comprises at least one LED.

6. The LED lighting circuit of claim 1, wherein said LED lighting circuit is encapsulated by an electrically insulating material.

7. The LED lighting circuit of claim 1, further comprising a potentiometer AC dimmer circuit connected to the AC power input signal that limits the voltage across the peak current limiting circuit, thereby making the LED mesh circuit dimmable.

8. The LED lighting circuit of claim 1, further comprising a triac AC dimmer circuit connected to the AC power input signal that lowers the duty cycle of the peak current limiting circuit, thereby making the LED mesh circuit dimmable.

9. An LED lighting circuit comprising:
   a rectification circuit for converting an AC input power signal to a rectified DC power signal;
   a peak current limiting circuit electrically coupled to the rectification circuit for providing a peak current limiting means from the voltage ripple of said rectified DC power signal,
   wherein said voltage ripple is intentionally unreduced, whose output creates a current source; and
   an LED mesh circuit electrically coupled to the output of the peak current limiting circuit and receives said current source as an input;
   wherein said unreduced voltage ripple input to said peak current limiting circuit is allowed to vary, and at least one electrical characteristic of at least one of the LEDs in said LED mesh circuit is chosen such that variations in the luminous flux intensity are rendered unobservable to the human eye.

10. The method of claim 9, wherein one or more resistors provide said peak current limiting means.

11. The method of claim 9, wherein an active circuit provides said peak current limiting means.

12. The method of claim 9, wherein capacitor, inductor, and heatsink components are omitted.

13. The method of claim 9, wherein said LED mesh circuit comprises at least one LED.

14. The method of claim 9, wherein said LED lighting circuit is encapsulated by an electrically insulating material.

15. The method of claim 9, further comprising a potentiometer AC dimmer circuit connected to the AC power input signal that limits the voltage across the peak current limiting circuit, thereby making the LED mesh circuit dimmable.

16. The method of claim 9, further comprising a triac AC dimmer circuit connected to the AC power input signal that lowers the duty cycle of the peak current limiting circuit, thereby making the LED mesh circuit dimmable.

17. A method of operating an LED lighting circuit, comprising the steps of:
   rectifying an AC power input signal to a rectified DC power signal;
   producing an intentionally unreduced voltage ripple from said rectified DC power signal;
   electrically coupling a peak current limiting circuit to the rectification circuit for providing a peak current limiting means from the voltage ripple of said rectified DC power signal, wherein said voltage ripple is intentionally unreduced, so that said unreduced voltage ripple input to said peak current limiting circuit is allowed to vary, and at least one electrical characteristic of at least one of the LEDs in said LED mesh circuit is chosen such that variations in the luminous flux intensity are rendered unobservable to the human eye, whose output creates a current source; and
   electrically coupling an LED mesh circuit to the output of the peak current limiting circuit and receiving said current source as an input.

18. The method of claim 17, wherein the AC input power range is between 50 VRMS, inclusive, and 350 VRMS, inclusive, with a maximum of 20% of the AC input power allocated to the peak current limiting circuit, with said current source equal to or less than 20 mA per LED.

* * * * *